(12) United States Patent
Rumpf et al.

(10) Patent No.: US 8,050,244 B2
(45) Date of Patent: *Nov. 1, 2011

(54) COMMUNICATION SYSTEM PROVIDING HYBRID OPTICAL/WIRELESS COMMUNICATIONS AND RELATED METHODS

(75) Inventors: Raymond Charles Rumpf, Melbourne, FL (US); Eric G. Johnson, Oviedo, FL (US)

(73) Assignee: Harris Corporation, Melbourne, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/472,586

(22) Filed: May 27, 2009

(65) Prior Publication Data

US 2009/0232508 A1    Sep. 17, 2009

Related U.S. Application Data

(63) Continuation of application No. 10/238,835, filed on Sep. 10, 2002, now Pat. No. 7,583,642.

(51) Int. Cl.
*H04W 4/00* (2009.01)

(52) U.S. Cl. ....................................... 370/338
(58) Field of Classification Search .................. None
See application file for complete search history.

(56) References Cited

U.S. PATENT DOCUMENTS

| 4,399,566 A | 8/1983 | Roullet et al. ................ 398/197 |
| 5,390,271 A | 2/1995 | Priest ............................. 385/92 |
| 5,748,813 A | 5/1998 | Cassidy et al. ................. 385/24 |
| 5,818,617 A | 10/1998 | Shipley ........................ 359/135 |
| 5,926,301 A | 7/1999 | Hirt ............................... 359/154 |
| 5,933,263 A | 8/1999 | Kinstler ........................ 359/142 |
| 6,031,862 A | 2/2000 | Fullerton et al. .............. 375/200 |
| 6,111,399 A * | 8/2000 | Draaijer ........................... 324/96 |
| 6,141,037 A | 10/2000 | Upton et al. ..................... 348/65 |
| 6,246,819 B1 | 6/2001 | Windebank ...................... 385/48 |
| 6,265,710 B1 | 7/2001 | Walter ...................... 250/227.11 |
| 6,304,696 B1 | 10/2001 | Patterson et al. ............... 385/37 |
| 6,327,407 B1 | 12/2001 | Mitsuda et al. ................. 385/49 |

(Continued)

FOREIGN PATENT DOCUMENTS

EP    0188085    7/1986

(Continued)

OTHER PUBLICATIONS

Marcucci, "Ultra Wideband: Wireless Technology for the Future", Radio Business Report, Inc., May 2000.

(Continued)

*Primary Examiner* — Anh-Vu Ly
(74) *Attorney, Agent, or Firm* — Allen, Dyer, Doppelt, Milbrath & Gilchrist, P.A.

(57) ABSTRACT

A communication system includes at least one optical-wireless device coupled to a longitudinal side of an optical fiber. The optical-wireless device may include an optical fiber power unit for converting optical power into electrical power, and a wireless communication unit electrically powered by the optical fiber power unit. The optical-wireless device may include a substrate mounting the optical fiber power unit and the wireless communication unit to the longitudinal side of the optical fiber. The wireless communication unit may include a radio frequency transmitter, and a signal optical grating coupling the transmitter to the longitudinal side of the optical fiber. The radio frequency transmitter in some embodiments may include an ultra-wideband transmitter. A dipole antenna may also be provided including first and second portions extending in opposite directions along the longitudinal side of the optical fiber.

25 Claims, 4 Drawing Sheets

U.S. PATENT DOCUMENTS

| | | | |
|---|---|---|---|
| 6,417,946 B1 | 7/2002 | Krieger | 359/152 |
| 6,668,119 B2 * | 12/2003 | Matsumoto et al. | 385/52 |
| 6,674,966 B1 | 1/2004 | Koonen | 398/70 |
| 6,853,835 B2 | 2/2005 | Wynbeek | 455/422 |
| 6,869,347 B2 | 3/2005 | Koinkar et al. | 451/364 |
| 6,925,258 B2 | 8/2005 | Lo | 398/47 |
| 6,925,322 B2 | 8/2005 | Helfer et al. | 600/423 |
| 6,965,302 B2 | 11/2005 | Mollenkopf et al. | 340/310.01 |
| 7,146,105 B1 | 12/2006 | Tzeng et al. | 398/128 |
| 7,583,642 B2 * | 9/2009 | Rumpf et al. | 370/338 |
| 2002/0171897 A1 | 11/2002 | Cho et al. | 359/172 |
| 2003/0134596 A1 | 7/2003 | Zhu | 455/422 |
| 2004/0208598 A1 | 10/2004 | Wittenberger et al. | 398/130 |
| 2006/0117113 A1 | 6/2006 | Elliott et al. | 709/239 |

FOREIGN PATENT DOCUMENTS

| | | |
|---|---|---|
| JP | 61095634 | 5/1986 |
| JP | 1107214 | 4/1989 |
| JP | 2073313 | 3/1990 |
| JP | 3160833 | 7/1991 |
| JP | 4048832 | 2/1992 |
| JP | 5090715 | 4/1993 |
| JP | 6075137 | 3/1994 |
| JP | 6152539 | 5/1994 |
| JP | 8136775 | 5/1996 |
| JP | 10160964 | 6/1998 |
| JP | 10508725 T | 8/1998 |
| JP | 11068675 | 3/1999 |
| JP | 11340953 | 12/1999 |
| JP | 2000022582 | 1/2000 |
| JP | 2000056168 | 2/2000 |
| JP | 2000252922 | 9/2000 |
| JP | 2001326415 | 11/2001 |

OTHER PUBLICATIONS

Vaughan-Nichols, "Ultrawideband Wants To Rule Wireless Networking", Oct. 31, 2001, available at http://www.zdnet.com/.

* cited by examiner

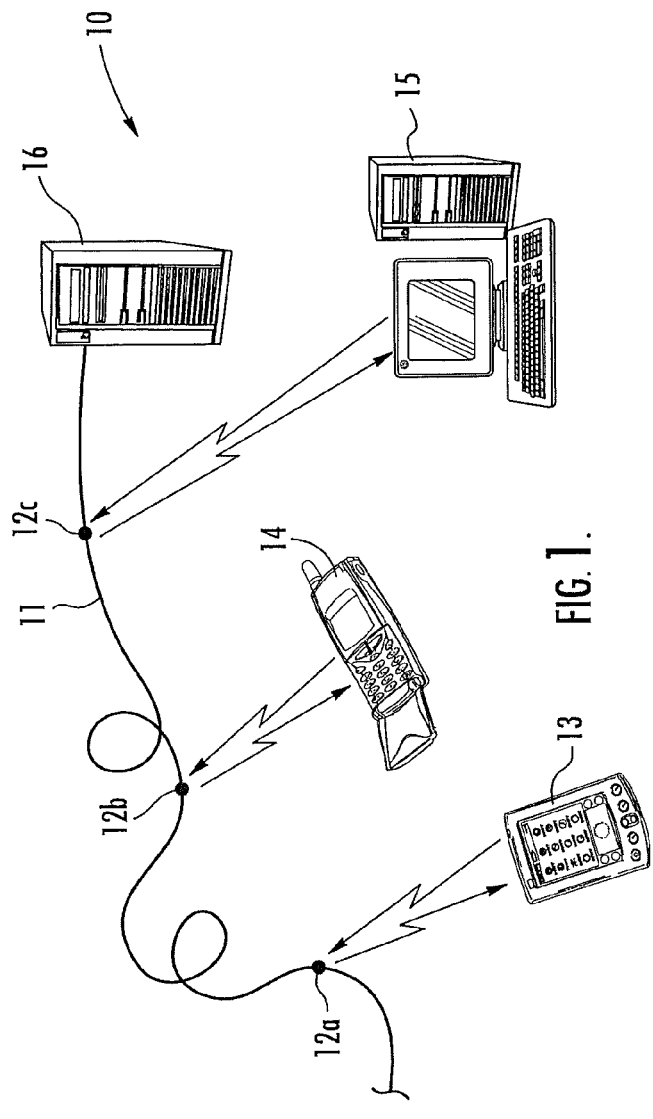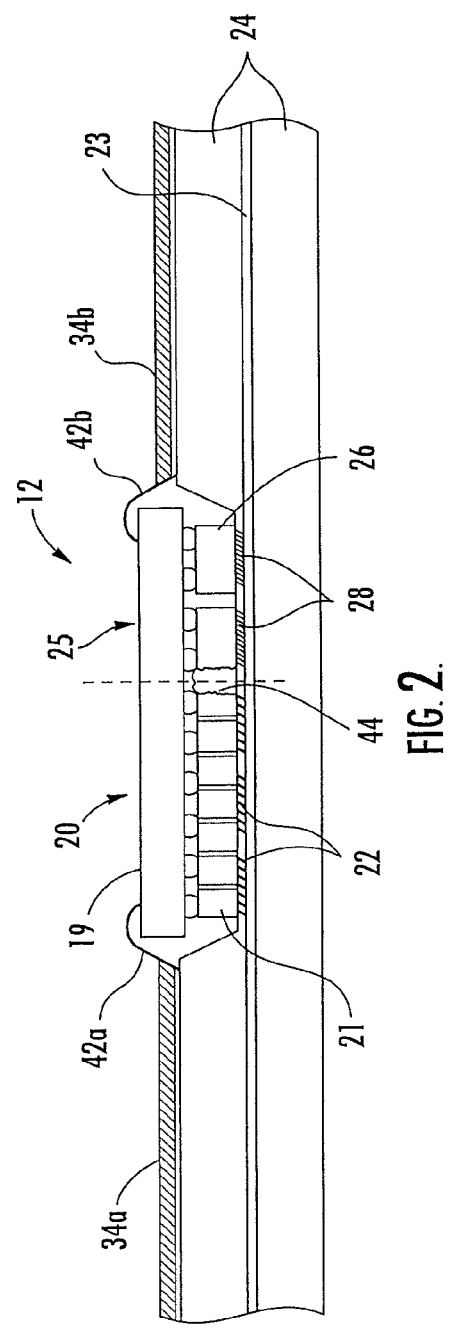

COMMUNICATION SYSTEM PROVIDING HYBRID OPTICAL/WIRELESS COMMUNICATIONS AND RELATED METHODS

RELATED APPLICATION

This application is a continuation of Ser. No. 10/238,835 filed Sep. 10, 2002 now U.S. Pat. No. 7,583,642, the entire disclosure of which is hereby incorporated herein by reference.

FIELD OF THE INVENTION

The present invention relates to the field of communications, and, more particularly, to a communication system, devices and associated methods for hybrid optical/wireless communications and conversions.

BACKGROUND OF THE INVENTION

Communications systems are often used to route data, voice, and/or video signals among users. One typical communications system is the Local Area Network (LAN) that interconnects a plurality of computer workstation users. Perhaps the most common way in which computers or other devices are connected together in a LAN is through electrically conductive wires. For example, wall or floor connectors may be located throughout a building to which computer workstations are connected, and metal wires are run from the wall connectors to one or more central locations where they may be connected to centralized computing devices, such as a server.

Certain disadvantages may accompany the use of wired networks. For instance, because electrical power is being transmitted over the wires, the installation of the wires may be subject to electrical codes that may make installation more difficult or even costly. Furthermore, the bandwidth that is available using typical metal wires (e.g., copper wires) may be less than desirable for some applications.

As a result of such limitations, other types of interconnections have been utilized in an attempt to provide "copperless" networks. For example, fiber-optic lines allow light signals which correspond to electrical signals to be transmitted between computers or other devices at a very high rate and bandwidth. Yet, fiber-optic communication is often more expensive than wires, and thus running fiber-optic lines to numerous wall connectors may be cost prohibitive in some circumstances.

Further, fiber-optic cables may be more difficult to extract signals from than wires. As a result, various approaches for addressing the difficulties of signal extraction from optical fibers have been developed. One such approach is disclosed in U.S. Pat. No. 6,265,710 in which light emerging from an optical fiber is directed by focusing elements at a photodetector or at the input face of another glass fiber. Another approach is to use gratings which are physically configured to capture light of a particular wavelength. An example of this approach is disclosed in U.S. Pat. No. 6,304,696 to Patterson et al.

Another way to interconnect one or more devices in a LAN is to use wireless communications links. For example, each device in the LAN may include a wireless radio frequency (RF) transceiver for sending and receiving data signals to other devices using one or more designated frequencies. While this approach has the advantage of requiring less, if any, wall connectors than a wired or fiber-optical network, the wireless communications links may be subject to interference, signal distortion, or signal loss as devices are moved to various locations.

SUMMARY OF THE INVENTION

In view of the foregoing background, it is therefore an object of the invention to provide a communication system that effectively uses the advantages of optical fiber and wireless communication.

This and other objects, features and advantages in accordance with the present invention are provided by a communication system including an optical fiber, and at least one optical-wireless device coupled to a optical fiber. By way of example, the at least one optical-wireless device may be coupled to the fiber by standard fiber connectors, microfabrication of grating structures within the fiber, surface polished fiber to serve as an electronic substrate, etc. Moreover, the optical-wireless device may include an optical fiber power unit coupled to the optical fiber for converting optical power therein into electrical power, and a wireless communication unit electrically powered by the optical fiber power unit and coupled to the optical fiber. The optical-wireless device may include a substrate mounting the optical fiber power unit and the wireless communication unit to the longitudinal side of the optical fiber.

The optical fiber power unit may include a photovoltaic device and a power optical grating coupling the photovoltaic device to the longitudinal side of the optical fiber. The wireless communication unit may include a radio frequency transmitter, and a signal optical grating coupling the transmitter to the longitudinal side of the optical fiber.

In accordance with another important aspect of the invention, the radio frequency transmitter may be an ultra-wideband transmitter. The ultra-wideband transmitter, in turn, may include an optical detector having an input coupled to the signal optical grating; an amplifier having an input connected to the output of the optical detector; a pseudorandom code generator; a multiplier having inputs connected to the outputs of the amplifier and pseudorandom code generator; and a pulse generator having an input connected to the output of the multiplier.

The ultra-wideband transmitter may also include an antenna connected to the output of the pulse generator. By way of example, the antenna may be a dipole antenna. For a particularly compact and efficient construction, the dipole antenna preferably includes first and second portions extending in opposite directions along the longitudinal side of the optical fiber.

The optical fiber may include a core and a cladding surrounding the core. Accordingly, the optical fiber power unit and the wireless communication unit may be coupled to the core of the optical fiber.

In those embodiments where the wireless communication unit includes a wireless transmitter, the system may further include at least one wireless receiver spaced from the wireless transmitter and receiving signals therefrom. Conversely, in those embodiments where the wireless communication unit comprises a wireless receiver, the system may also include at least one wireless transmitter spaced from the wireless receiver and transmitting signals thereto. Of course, in yet other embodiments, duplex communications may be provided.

The communication system is particularly applicable to copperless networks. In these embodiments, the at least one optical-wireless device may be a plurality of optical-wireless devices coupled to the optical fiber at spaced apart locations along the longitudinal side of the optical fiber. In some situations, a plurality of optical-wireless devices can be coupled to the optical fiber.

Different optical wavelengths may be used for powering and signals in the optical-wireless device. More particularly, the wireless communication unit may operate at a first optical wavelength, and the system may include an optical power source coupled to the optical fiber for powering the optical fiber power unit and operating at a second wavelength different than the first optical wavelength. Additionally, instead of different optical wavelengths, the optical-wireless devices could also operate from different modes, polarizations, codes, or otherwise differentiate signals and power between the optical-wireless devices.

A method aspect of the invention is for optical-wireless communication. The method may include coupling at least one optical-wireless device to a longitudinal side of an optical fiber, where the at least one optical-wireless device may include an optical fiber power unit and a wireless communication unit connected thereto. The method may also include supplying optical power into the optical fiber, converting the optical power in the optical fiber into electrical power using the optical fiber power unit, and electrically powering the wireless communication unit for optical-wireless communication using the electrical power converted from the optical power. In addition, external power could be supplied by methods such as solar cells, rectifying antennas, or by electrical wire, for example.

BRIEF DESCRIPTION OF THE DRAWINGS

FIG. 1 is a schematic diagram of a communication system according to the present invention including a plurality of optical-wireless devices coupled to an optical fiber.

FIG. 2 is partial cross-sectional view illustrating one embodiment of an optical-wireless device and the optical fiber of FIG. 1 in greater detail.

DETAILED DESCRIPTION OF THE PREFERRED EMBODIMENTS

Figure 3:
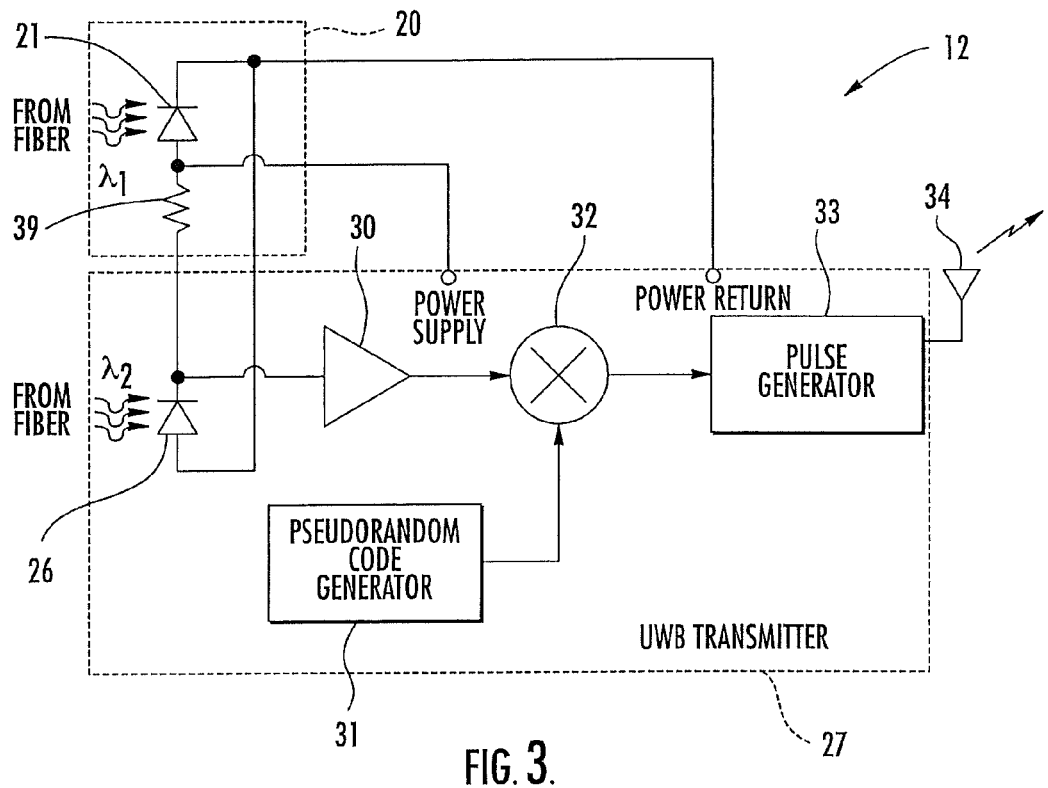
FIG. 3 is a schematic block diagram of an ultra-wideband transmitter and power generation circuitry therefor for the optical-wireless device of FIG. 2.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Referring initially to FIG. 1, a communication system 10 according to the present invention illustratively includes an optical fiber 11, and at least one optical-wireless device 12 coupled to a point(s) along a longitudinal side of the optical fiber. In the context of a LAN, for example, the optical fiber 11 may be connected to a server 16 or other central data source/node to which electronic devices such as personal data assistants 13, cellular telephones 14, and/or personal computers (PCs) 15 require access. Of course, those of skill in the art will appreciate that the communication system 10 of the present invention may be used in numerous other applications other than LANs, and also with other types of electronic devices.

As such, those of skill in the art will appreciate that the communication system 10 is particularly applicable to copperless networks. In such embodiments, a plurality of optical-wireless devices 12a, 12b, 12c may be coupled to the optical fiber 11 at spaced apart locations along the longitudinal side of the optical fiber. The optical-wireless devices 12a, 12b, 12c are used for respectively providing wireless communications with the personal data assistant 13, the cellular telephone 14, and the personal computer (PC) 15. As will be discussed more fully below, the optical-wireless device 12 may advantageously be used to convert optical signals sent on the optical fiber 11 (e.g., by the server 16) to wireless signals and transmit the same to a respective electronic device. Conversely, the optical-wireless device 12 may also convert wireless signals sent from a respective electronic device to corresponding optical signals and send the same on the optical fiber 11 (e.g., to the server 16), as illustratively shown with arrows in FIG. 1.

As a result of the optical-wireless device 12 of the present invention, the communication system 10 may advantageously realize certain advantages of both optical and wireless communications while avoiding some of their respective drawbacks. More particularly, one or more optical fibers 11 may be used to route signals from a server 16 or other central data source throughout an entire physical network area (e.g., a floor of a building, a ship, etc.) without having to run optical fibers to numerous workstation connection points.

Further, because optical signals can travel relatively long distances over optical fibers with minimal degradation, the range over which the communication system 10 extends may be much larger than that of a purely wireless network, and may even extend between buildings, etc., without the need for wireless signal repeaters. Plus, since the wireless signals transmitted between the optical-wireless device 12 and a respective electronic device generally do not have to travel as far as in a purely wireless network (i.e., they only have to travel to the nearby optical fiber 11 and not all the way to the server 16), interference and signal degradation may potentially be reduced as well.

Figure 4:
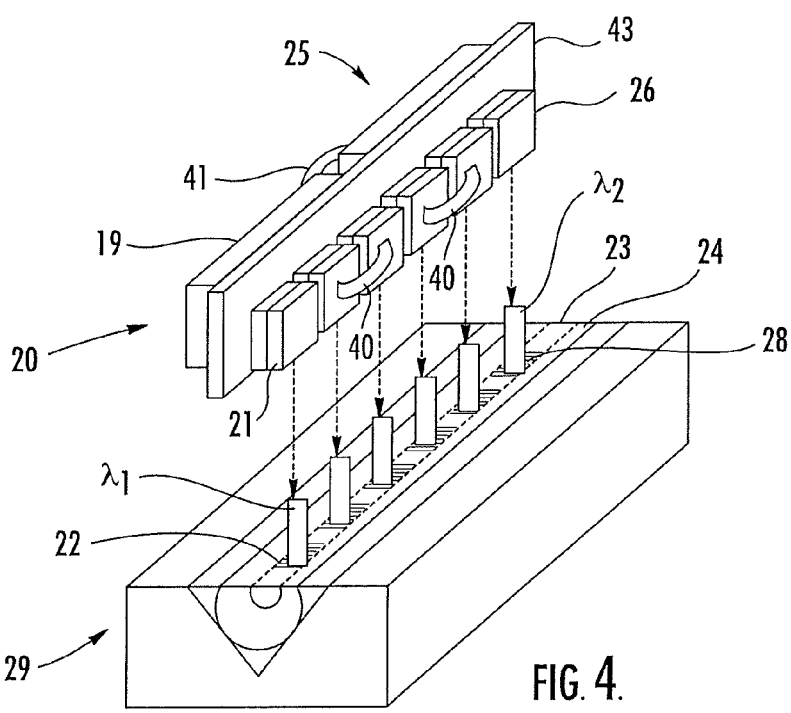
FIG. 4 is a perspective view illustrating mounting of an alternate arrangement of the optical-wireless device of FIG. 2 on the optical fiber.

Turning now more particularly to FIGS. 2-4, the optical-wireless device 12 will now be described in greater detail. The optical fiber 11 may include a core 23 and a cladding 24 surrounding the core, as will be appreciated by those of skill in the art. The optical-wireless device 12 may include an optical fiber power unit 20 coupled to the core 23 for converting optical power therein into electrical power, as will be described further below.

Further, a wireless communication unit 25 may also be coupled to the core 23 of the optical fiber 11 and electrically powered by the optical fiber power unit 20. In some embodiments, such as the one illustrated in FIG. 2, portions of the optical fiber power unit 20 and the wireless communication unit 25 may be embodied in a single integrated device. A dotted line is therefore shown in FIG. 2 to aid in illustrating that the two separate functions are performed in the same optical-wireless device 12, although no particular segmentation or arrangement of the various circuit components is required.

Figure 5:
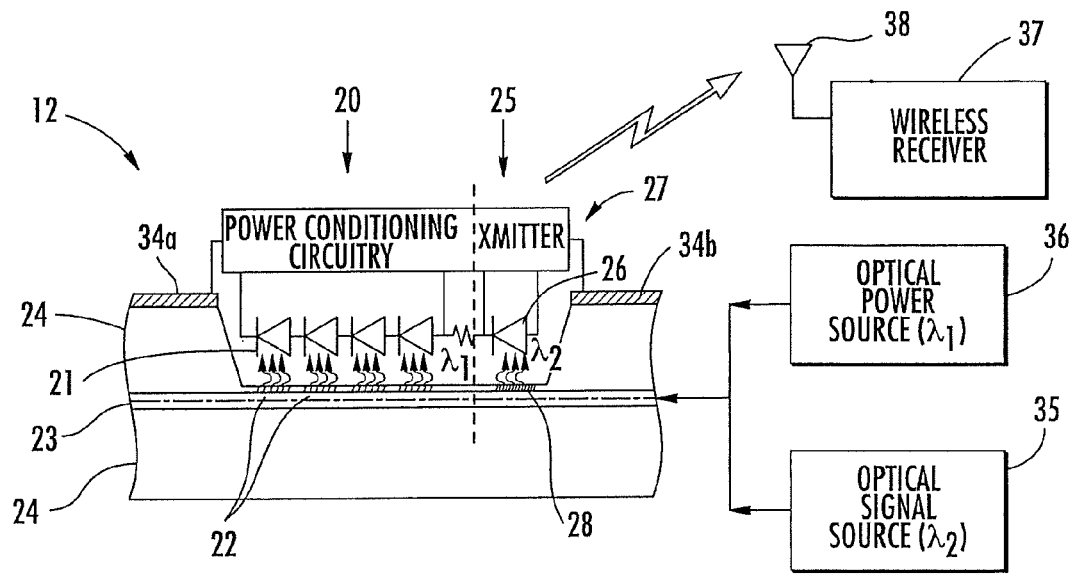
FIG. 5 is a schematic block diagram illustrating communications between an optical-wireless device according to the invention including an ultra-wideband transmitter and a receiver.
Figure 6:
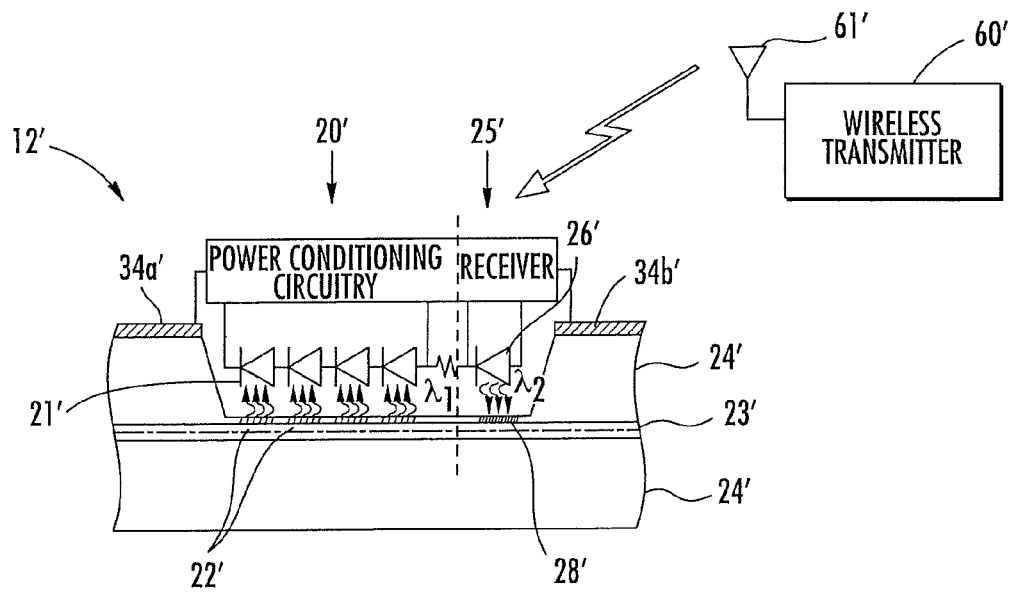
FIG. 6 is a schematic block diagram illustrating communications between a transmitter and an optical-wireless device according to the invention including an ultra-wideband receiver.

The optical fiber power unit 20 may include one or more photovoltaic devices 21 and a respective power optical grating 22 designed specifically to extract light from the core 23 of the optical fiber 11 to be used for power generation. As such, the power optical grating 22 is preferably "tuned" to extract light having a particular optical wavelength $\lambda_1$ from the core 23, which is converted to electrical power for the wireless communications device 25. As will be appreciated by those skilled in the art, a micro-optic structure to extract light for power generation may be "tuned" to specific wavelengths, polarizations, modes, etc. The optical fiber power 20 unit 20 may optionally include additional power conditioning circuitry as required, as will be appreciated by those of skill in the art, which is schematically shown in FIGS. 5 and 6.

By way of example, one particular type of photovoltaic device 21 which may be used is a relatively large-area planar-diffused InGaAs photodiode with a broadband anti-reflection coating on the photosensitive surface. Such diodes are known to those of skill in the art. Several such photovoltaic diodes 21 may be connected in series (illustratively shown in FIGS. 5 and 6) to generate the requisite voltage to power the wireless communication unit 25 and reverse bias an optical signal detector 26 thereof (discussed further below). The photodiodes 21 are preferably placed over respective gratings 22 in a manner that optimizes the illumination efficiency.

As will be appreciated by those of skill in the art, to optimize the illumination efficiency of a photodiode it is important to have the maximum amount of light extracted from the core 23 absorbed within the depletion region of the photodiode 21. Light extracted from the core 23 and not absorbed in the depletion region represents loss and a reduction in efficiency. Losses can result from reflections, misdirected or misfocused light, and absorption of photons outside the depletion region. Anti-reflection coatings, junction orientation, and beam focusing may be tailored in a particular design application to minimize losses, as will also be appreciated by those skilled in the art.

One exemplary approach for illuminating a photodiode 21 is to have the light incident normal to the photodiode junction. An alternate approach would be to have the incident light parallel to the photodiode 21 junction. The latter approach has the advantage of aligning the junction along the length of the core 23. This may accommodate longer gratings 22 with enhanced functionality, for example. Other approaches may potentially be used as well, as will be understood by those skilled in the art.

It will also be understood that for maximum power delivery to a load from a power source, load resistance and equivalent source resistance is preferably made equal. Under illumination, a photodiode connected to an open circuit load will produce a photovoltage, $V_{OC}$. Likewise, a photodiode connected to a short circuit load will produce a photocurrent, ISC. The equivalent source resistance, REQ, of the photodiode is then approximately $V_{OC}/I_{SC}$. To optimize power delivery to the optical-wireless device 12, the source resistance and load resistance should preferably be tailored in each particular application to achieve an optimal match, as will be appreciated by those skilled in the art.

In addition to optimizing illumination of the photodiodes, parasitic impedances introduced by the packaging into the electrical interconnect should preferably be held to a minimum. Parasitic resistance in the power source conductors will decrease power conversion efficiency, as will be appreciated by those of skill in the art. Care may also need to be taken to ensure that parasitic impedances between the transmitter 27 and antenna 34 (FIG. 3) do not overly limit the bandwidth and/or shape of the radiated pulses. Various types of interconnections may be used in accordance with the present invention, and potential criteria for the selection thereof are that they should be simple, inexpensive, and accommodate mass production.

One such approach for forming the electrical interconnections is to use conductive epoxy. Forming interconnections in this manner is well known in the art, has lower parasitic inductance than wire bonding, and occupies less physical space than other conventional interconnections. The same epoxy forming the interconnect can also permanently hold the devices in place. In addition, additives can be used to alter the conductivity of the epoxy to form a resistor 39 (FIG. 3) used to bias the signal detecting diode 26. This is possible because of the very low power requirements of the biasing resistor 39 in the signal detector circuit. Further, non-conductive epoxy 44 may be used to isolate the photodiodes 21 form the signal detecting diode(s) 26.

Multifunctional use of epoxy may reduce package complexity, size, the number of process steps required for assembly, and cost. Where wire bonds are more appropriately used, the parasitics associated therewith are preferably held to a minimum. Wire bonds can easily introduce nano-Henry level inductances into the package if care is not taken. One method to reduce the parasitics of a wire bond is to press the bond flat toward the package 19 or substrate 43 (FIG. 4) This limits the wire curvature to reduce flux linkage, and brings the wire closer to the ground plane to act more as a transmission line with controlled impedance.

In particular, wire bonds 40 may be used for coupling the photodiodes 21 in series, as described above, and wire bonds 41 may be used for coupling the optical power fiber unit 20 to the wireless communications unit 25. Additionally, wire bonds 42a, 42b may be used for coupling the wireless communications unit 25 to the dipole antenna elements 34a, 34b (FIG. 1).

The wireless communication unit 25 may include a radio frequency (RF) transmitter 27, and an optical signal grating 28 optimized for extracting optical data signals from the fiber 11. Of course, the optical signal grating 28 and power grating 22 may be optimized differently. According to one important aspect of the invention, the RF transmitter 27 may be an ultra-wideband (UWB) transmitter. UWB provides wireless communications spread to very low power spectral density across a very wide band of frequencies. Data is transmitted by modulating and radiating discrete pulses of RF energy. As a result, UWB may be particularly advantageous for use in the communication system 10 because it may coexist with many existing continuous wave narrowband systems without interference. Furthermore, the broad spectral nature and/or low frequency content of UWB pulses makes it better suited to penetrate walls and obstacles than other existing technologies. Of course, those of skill in the art will appreciate that other forms of wireless communication may also be used in accordance with the present invention.

As illustratively shown in FIG. 3, for example, the ultra-wideband transmitter 27 may include an optical signal detector 26 having an input coupled to the signal optical grating (FIG. 2). The signal detector 26 may also be a photodiode, such as the InGaAs photodiode described above. The same considerations described above with respect to placement, efficiency, etc. of the photodiodes 21 is also applicable to the photodiode 26, and will therefore not be discussed further here except to note that typically only one photodiode 26 is required for signal detection (although more may be used). Further, optional signal conditioning circuitry (not shown) may also be included in some embodiments-which, in those embodiments where the wireless communication unit 25 is implemented using semiconductor technology, may be implemented using the same technology.

An amplifier 30 has an input connected to the output of the optical detector 26. The transmitter further includes a pseudorandom code generator 31, a multiplier 32 having inputs connected to the outputs of the amplifier 30 and the pseudorandom code generator, and a pulse generator 33 having an input connected to the output of the multiplier. Other UWB transmitter circuitry arrangements are also possible, as will be understood by those of skill in the art.

The ultra-wideband transmitter 27 may also include an antenna 34 connected to the output of the pulse generator 33. By way of example, the antenna 34 may be a dipole antenna connected to the ultra-wideband transmitter 27 (or other suitable RF device) by wire bonds 42a, 42b (FIG. 1). For a particularly compact and efficient construction, the dipole antenna 34 preferably includes first and second portions 34a, 34b extending in opposite directions along the longitudinal side of the optical fiber 11, as illustratively shown in FIG. 2.

To maintain a low profile, it would be preferable to use a broadband dipole antenna 34 that can be integrated onto the side of the optical fiber. Yet, as will be appreciated by those of skill in the art, most dipole antennas have an inherently narrow band because they are resonant structures that support standing waves. Accordingly, various approaches may be used to increase the bandwidth of the dipole antenna 34 to support ultra-wideband transmission more efficiently. One such approach is the traveling wave approach, in which the current distribution in the antenna is altered so that it supports a traveling wave.

More particularly, the amplitude of the current wave is made to decrease with distance away from the input terminals by using a resistive material to form the dipole. The antenna 34 may be truncated at the point where the current distribution becomes negligible without significantly affecting the performance of the antenna. With very little current to reflect from the dipole endpoints, resonance is avoided and the structure supports traveling waves. This approach improves bandwidth, but potentially at the cost of efficiency due to dissipative losses in the antenna 34. It will be appreciated by those skilled in the art that the resistance profile of the antenna 34 may need to be varied along its length to optimize the trade-off between efficiency and bandwidth in some applications. Further information regarding this approach may be found in Tonn et al., "Traveling Wave Microstrip Dipole Antennas", I.E.E.E., Electronics Letters, volume 31, issue 24, Nov. 23, 1995, pages 2064 to 2066.

Yet another approach is that of impedance loading, which purposely introduces parasitics to broaden the frequency response by making the effective length of the dipole frequency dependent. This is accomplished by preventing higher frequencies from having multiple resonances and confining them to a smaller portion of the dipole. Here again, this approach may improve bandwidth at the cost of efficiency due to dissipative losses in the parasitic loads. Thus, the impedance profile of the antenna 34 may need to be varied along its length to optimize the trade-off between efficiency and bandwidth in some applications. Further information on this approach may be found in "Numerical modeling and design of loaded broadband wire antennas" by Austin et al., I.E.E.E, Fourth International Conference on HF Radio Systems and Techniques, 1988, pages 125 to 129.

Accordingly, those skilled in the art may be required to determine which of the above approaches (or others) may be best suited for a particular implementation of the present invention. Furthermore, the impedance and/or resistance profile of the antenna can be tailored for reasons other than bandwidth and efficiency. The profile can be designed and optimized for functions such as pulse shaping and signal filtering.

As noted above, in accordance with one aspect of the present invention, the power optical grating 22 is used for extracting light from the core 23 to power the wireless communications unit 25, and the optical signal grating 28 is used to either extract light from (in the case of signal transmission from the wireless communications unit) or introduce light into (i.e., in the case of signal reception by the wireless communications unit) the core. Of course, those of skill in the art will appreciate that other approaches exist for extracting light from an optical fiber 11, such as evanescent coupling, power splitting, or even multiple fibers. Such approaches, as well as other suitable approaches known to those skilled in the art, are also included within the scope of the present invention.

Preferably, different optical wavelengths are used for powering and signals in the optical-wireless device 12. More particularly, the wireless communication unit 25 may operate with light having an optical wavelength $\lambda_2$, which is provided (in the case of transmission by the wireless communication unit) by an optical signal source 35 (FIG. 5). In such case, the optical signal grating 28 is "tuned" to $\lambda_2$, as will be discussed further below. Further, the communication system 10 may include an optical power source 36 coupled to the optical fiber, and, more particularly, the core 23, for powering the optical fiber power unit 20 using light having the wavelength $\lambda_1$, as noted above. Of course, in some embodiments it may be possible to extract both signals and power from a single source of light having the same wavelength. The optical power source 36 and the optical signal source 35 may be circuitry internal to the server 16, for example.

Fabrication of the gratings 22 and 28 will now be discussed in further detail. To facilitate the fabrication process, a fiber bench 29 may advantageously be used. A fiber bench is a section of fiber where a portion of the cladding 24 is polished away to form a flat surface in close proximity to the fiber core 23. It will be appreciated by those skilled in the art that the surface gratings 22, 28 fabricated on the fiber bench 29 can exploit the evanescent field to perform a variety of functions such as spectral filtering, dispersion compensation, mode matching, mode stripping, or light extraction and injection. The gratings 22, 28 can also be designed to perform these functions over selected wavelengths (e.g., $\lambda_1$ and $\lambda_2$) or modes, while not affecting others.

Interfacing with the optical fiber 11 in this manner has the advantages of lower insertion loss, reduced system complexity, enhanced functionality, and the potential for volume production. A conventional splice might otherwise suffer from higher losses in the optical fiber 11 when using multiple optical-wireless devices 12 operating from different wavelengths. The fiber bench 29 can also be used as a micro-sized substrate to host small devices such as MEMS, sensors (e.g., bio/chemical, acoustic, seismic, etc.), or other microsystems in certain embodiments.

The fiber bench 29 can be formed by placing the fiber in a silicon V-groove and filling the gaps with an epoxy. With the epoxy cured, the entire assembly is polished until the cladding 24 of the optical fiber 11 is within close proximity to the core 23. A liquid drop test measurement may then be used to accurately control the proximity of the fiber bench 29 surface to the fiber core 23. The process may be automated, and systems with fiber benches can potentially be mass produced at low cost. For further details on the use of fiber benches, see, e.g., Leminger and Zengerle, Journal of Lightwave Technology, Volume 3, 1985.

Additional benefits of this approach include the ability to use the silicon bench 29 portion of the device for integration with detector electronics. Moreover, it is feasible that additional optics and/or antenna elements (not shown) can be integrated on the silicon portion of the fiber bench 29, as will be appreciated by those of skill in the art.

The liquid drop test measurement method assesses the proximity of the fiber bench 29 surface to the core 23 of the optical fiber 11. Light is injected into one end of the optical fiber 11 so that it propagates through the region of the fiber bench 29 and eventually to a power meter. By placing a drop of liquid on the fiber bench 29 surface, light is outcoupled in the region of the liquid and can be measured by the power meter as loss. The fraction of light lost can be used to compute the distance from the bench surface to the core of the fiber.

One approach for fabricating the gratings 22, 28 involves tilting the core 23 during the formation thereof. As will be understood by those of skill in the art, gratings are inherently spectrally selective due to their dispersive properties, and can be designed to selectively redirect bands of wavelengths out of the core 23. The outcoupled light would be subsequently focused onto the photodiodes 21, 26 using micro-optical elements fabricated on the flat side of the optical fiber 11. Since this approach requires photosensitive glass to produce the gratings 22, 28 adjacent the core 23, a strong variation in the index may be difficult to realize. A low index modulation requires a long interaction length to couple large amounts of optical power out of the fiber. This may complicate focusing and limit micropackaging options.

Accordingly, standard lithographic processes may be used to fabricate the surface gratings 22, 28 by etching them onto the polished surface of a optical fiber 11. To reduce the interaction length, the index modulation may be greatly enhanced by applying a higher index material overcoat on the surface of the grating structure.

Tilted surface grating structures may also potentially be used to optimize light extraction and photodiode illumination efficiency. This can be achieved by placing the optical fiber 11 on a tilted fixture and using an anisotropic etch pattern on the fiber bench 29 surface. This approach can yield slant angles from 0 to 30 degrees, for example. To avoid the need for additional focusing optics, the interaction length of the grating structures 22, 28 is preferably no longer than the active regions of their respective photodiodes 21, 26. In this manner, the outcoupled light will be inherently confined to the area of the active region. If additional focusing becomes necessary, diffractive optics may be used to focus light onto the photodiodes 21, 26, as will be understood by those skilled in the art.

The above approach for extracting light is based on redirecting, or tapping, the guided light out of the optical fiber 11 from specific wavelengths, or modes, for power and signal extraction. An alternate approach views the problem as a spectrally selective directional coupler. The fiber core 23 and the photodiode substrate represent the two regions for light to propagate. By bringing these two regions in close proximity, it is possible to couple light from the fiber to the photodiode very efficiently by designing a spectrally selective grating to match the propagation constants of these two regions, effectively forming a directional coupler, as will be appreciated by those of skill in the art.

As noted above, light for signals and power may be provided on different wavelengths $\lambda_1$, $\lambda_2$ and, using the wavelength selective gratings 22, 28, the power and signal light can thereby be extracted separately. An alternate approach is to provide the light for signals and power on different propagating modes. For example, a process has been developed which uses a vortex lens to excite specific modes of a graded-index multimode which may be suitable for this purpose. This process is described by Johnson et al. in "Diffractive Vortex Lens for Mode-Matching Graded Index Fiber," Optical Society of America, Topical Meeting on Diffractive and Micro-Optics, 2000. Therefore, it may also be feasible to use diffractive optics to specifically launch light into different spatial modes for the power and signal wavelengths $\lambda_1$, $\lambda_2$, as will be appreciated by those skilled in the art. Correspondingly, it will also be appreciated that diffractive optics may potentially be designed for spatially demultiplexing the power and signal modes, respectively.

Another approach is to utilize a duplex fiber assembly with one fiber devoted to providing power and the other fiber for signal distribution. This will have some advantages in that the power channel can be amplified, or re-supplied, at various places in the network, without interrupting the signal fiber. In this manner, the power source can be distributed, which may make the communication system 10 more reliable and robust. Moreover, the optical fiber 11 can be used with wavelength division multiplexing (WDM) or dense WDM (DWDM) schemes, for example, as will be appreciated by those of skill in the art. This approach can distribute the different signals using standard passive WDM technology and standard amplifier technology for the power channel. However, this integration potentially requires a larger amount of real estate than the single optical fiber approach disclosed above. Of course, it will be appreciated that both embodiments are included within the scope of the present invention, and that a separate conductive wire could even be used to provide power in some embodiments.

As noted above, portions of the optical-wireless device may advantageously be implemented in a semiconductor device having a packaging 19 (FIG. 2). In this embodiment, the packaging 19 may serve as a substrate for mounting the optical fiber power unit 20 and the wireless communication unit 25 to the longitudinal side of the optical fiber 11. In the embodiment illustrated in FIG. 4, a separate substrate 43 (e.g., a ceramic substrate) may be used for this purpose as well.

One potential micropackaging approach illustrated in FIG. 4 involves making the various hardware portions modular. More particularly, a row of photodiodes 21, 26 is fixed to the front side of the ceramic substrate 43. The back side of the substrate 43 is populated with the UWB radio hardware described above. Electrical interconnection is provided by conductive and resistive epoxies, metal traces in the ceramic substrate, and wire bonds, as also noted above. In this configuration, the ceramic and silicon substrates could be "snapped" together, for example.

It was also noted above that the optical-wireless unit 12 may both transmit and receive wireless signals. In those embodiments where the wireless communication unit 12 includes a wireless transmitter 27, the communication system 10 may further include at least one wireless receiver 37 (and associated antenna 38) spaced from the wireless transmitter and receiving signals therefrom, as illustratively shown in FIG. 5. Conversely, in those embodiments where the wireless communication unit 12 includes a wireless receiver, the system may also include at least one wireless transmitter 60' (and associated antenna 61') spaced from the wireless receiver and transmitting signals thereto. Of course, in yet other embodiments, duplex communications may be provided, i.e., the wireless communications unit 12 may include a transceiver, for example.

Figure 7:
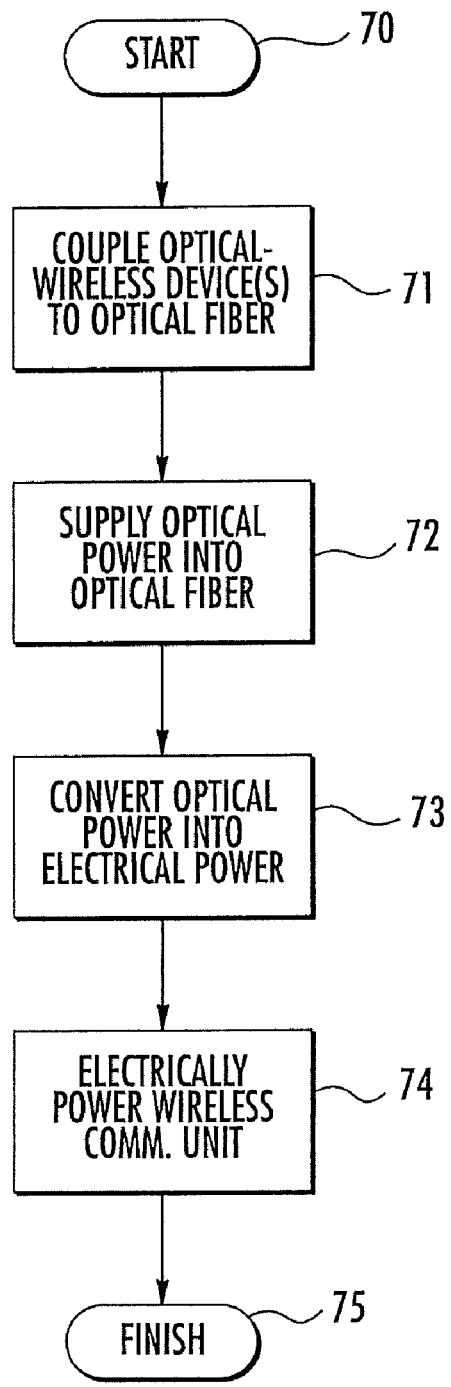
FIG. 7 is a flow diagram illustrating a method according to the present invention.

Turning now to FIG. 7, a method aspect of the invention for optical-wireless communication will now be described. The method may begin (Block 70) with coupling, at Block 71, at least one optical-wireless device 12 to a longitudinal side of an optical fiber 11, with the at least one optical-wireless device including an optical fiber power unit 20 and a wireless communication unit 25 connected thereto, as previously described above. The method may also include supplying optical power into the optical fiber 11, at Block 72, converting the optical power in the optical fiber into electrical power using the optical fiber power unit 20, at Block 74, and electrically powering the wireless communication unit 25 for optical-wireless communication using the electrical power converted from the optical power, at Block 73, thus concluding the method (Block 75). Additional method aspects will be understood from the above description and will therefore not be discussed further herein.

It will therefore be appreciated by those of skill in the art that numerous advantages are provided by the communication system 10 of the present invention. In particular, these advantages may include: seamless conversion between optical and wireless domains; reliable, untethered, and high capacity access to optical links; the potential benefits of ultra-wideband impulse radio; a high degree of covertness; a small compact form factor; distributing wireless node functionality along the optical fiber 11 without optical-electrical-optical splices; more survivable systems due to added redundancy; more mobile systems that are easier to manage than conventional optical-to-wireless systems; less complex systems than conventional optical-to-wireless converters; cabling minimization; systems that may be rapidly deployed at low cost; copperless LANs that are easier and quicker to install than conventional optical-to-wireless systems; significant increase in the reach of "conventional" UWB links and ad-hoc networks; latency and processing overhead may be substantially eliminated at optical/wireless interworking points; frequency allocation restraints may be bypassed; and system costs may be reduced.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A communication system comprising:
an optical fiber; and
at least one optical-wireless device coupled to a longitudinal side of said optical fiber and comprising
an optical fiber power unit coupled to said optical fiber for converting optical power therein into electrical power, and
a wireless communication unit electrically powered solely by said optical fiber power unit and coupled to said optical fiber;
said at least one optical-wireless device further comprising a substrate mounting said optical fiber power unit and said wireless communication unit to the longitudinal side of said optical fiber.

2. A communication system according to claim 1 wherein said optical fiber power unit comprises a photovoltaic device and a power optical grating coupling said photovoltaic device to the longitudinal side of said optical fiber.

3. A communication system according to claim 1 wherein said wireless communication unit comprises a radio frequency transmitter and a signal optical grating coupling said radio frequency transmitter to the longitudinal side of said optical fiber.

4. A communication system according to claim 3 wherein said radio frequency transmitter comprises an ultra-wideband transmitter.

5. A communication system according to claim 4 wherein said ultra-wideband transmitter comprises an antenna.

6. A communication system according to claim 5 wherein said antenna comprises a dipole antenna.

7. A communication system according to claim 6 wherein said dipole antenna comprises first and second portions extending in opposite directions along the longitudinal side of said optical fiber.

8. A communication system according to claim 1 wherein said optical fiber comprises a core and a cladding surrounding said core; and wherein said optical fiber power unit and said wireless communication unit are coupled to said core.

9. A communication system according to claim 1 wherein said wireless communication unit comprises a wireless transmitter; and further comprising at least one wireless receiver spaced from said wireless transmitter and receiving signals therefrom.

10. A communication system according to claim 1 wherein said wireless communication unit comprises a wireless receiver; and further comprising at least one wireless transmitter spaced from said wireless receiver and transmitting signals thereto.

11. A communication system according to claim 1 wherein said at least one optical-wireless device comprises a plurality of optical-wireless devices coupled to said optical fiber at spaced apart locations along the longitudinal side of said optical fiber.

12. An optical-wireless device to be coupled to a longitudinal side of an optical fiber and comprising:
a substrate for coupling to the longitudinal side of the optical fiber;
an optical fiber power unit carried by said substrate to be coupled to said optical fiber for converting optical power therein into electrical power; and
a wireless communication unit carried by said substrate, solely electrically powered by said optical fiber power unit, and to be coupled to the optical fiber.

13. An optical-wireless device according to claim 12 wherein said optical fiber power unit comprises a photovoltaic device and a power optical grating for coupling said photovoltaic device to the optical fiber.

14. An optical-wireless device according to claim 12 wherein said wireless communication unit comprises a radio frequency transmitter and a signal optical grating for coupling said radio frequency transmitter to the optical fiber.

15. An optical-wireless device according to claim 14 wherein said radio frequency transmitter comprises an ultra-wideband transmitter.

16. An optical-wireless device according to claim 15 wherein said ultra-wideband transmitter comprises:
an optical detector having an input coupled to said signal optical grating and having an output;
an amplifier having an input connected to the output of said optical detector and having an output;
a pseudorandom code generator having an output;

a multiplier having inputs connected to the outputs of said amplifier and pseudorandom code generator, and having an output;

a pulse generator having an input connected to the output of said multiplier, and having an output; and an antenna connected to the output of said pulse generator.

17. An optical-wireless device to be coupled to a longitudinal side of an optical fiber and comprising:

a substrate to be directly coupled to the longitudinal side of the optical fiber;

a wireless communication unit carried by said substrate and to be coupled to the optical fiber; and a dipole antenna connected to said wireless communication unit comprising first and second portions to extend in opposite directions along the longitudinal side of the optical fiber.

18. An optical-wireless device according to claim 17 wherein said wireless communication unit comprises a radio frequency transmitter and a signal optical grating for coupling said radio frequency transmitter to the optical fiber.

19. An optical-wireless device according to claim 18 wherein said radio frequency transmitter comprises an ultra-wideband transmitter.

20. An optical-wireless device according to claim 19 wherein said ultra-wideband transmitter comprises:

an optical detector having an input coupled to said signal optical grating and having an output;

an amplifier having an input connected to the output of said optical detector and having an output;

a pseudorandom code generator having an output;

a multiplier having inputs connected to the outputs of said amplifier and pseudorandom code generator, and having an output; and a pulse generator having an input connected to the output of said multiplier, and having an output connected to said antenna.

21. A method for optical-wireless communication comprising:

coupling at least one optical-wireless device to a longitudinal side of an optical fiber, the at least one optical-wireless device comprising an optical fiber power unit and a wireless communication unit connected thereto;

supplying optical power into the optical fiber;

converting the optical power in the optical fiber into electrical power using the optical fiber power unit; and electrically powering the wireless communication unit for optical-wireless communication solely using the electrical power converted from the optical power;

the optical-wireless device further comprising a substrate carrying the optical fiber power unit and the wireless communication unit, and wherein coupling comprises coupling the substrate to the longitudinal side of the optical fiber.

22. A method according to claim 21 wherein the wireless communication unit comprises a radio frequency transmitter and a signal optical grating coupling the radio frequency transmitter to the longitudinal side of the optical fiber.

23. A method according to claim 22 wherein the radio frequency transmitter comprises an ultra-wideband transmitter.

24. A method according to claim 21 wherein the optical-wireless communication device further comprises a dipole antenna including first and second portions; and wherein coupling comprises mounting the first and second portions to extend in opposite directions along the longitudinal side of the optical fiber.

25. A method according to claim 21 wherein the optical fiber comprises a core and a cladding surrounding the core; and wherein coupling comprises coupling the optical fiber power unit and the wireless communication unit to the core.

* * * * *